US006973144B1

United States Patent
Zhu et al.

(10) Patent No.: US 6,973,144 B1
(45) Date of Patent: Dec. 6, 2005

(54) APPARATUS AND METHOD FOR CHANNEL ESTIMATION USED FOR LINK ADAPTION WITH ERROR FEEDBACK

(75) Inventors: Pengfei Zhu, Morris Plains, NJ (US); Liwa Wang, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 848 days.

(21) Appl. No.: 09/659,879

(22) Filed: Sep. 12, 2000

(51) Int. Cl.[7] ............................................. H04B 1/10
(52) U.S. Cl. ........................ 375/350; 708/301; 708/319
(58) Field of Search ............................... 375/229–236, 375/346, 348, 349, 350; 708/300, 301, 313, 708/319, 320, 322, 323

(56) References Cited

U.S. PATENT DOCUMENTS

| | | | | |
|---|---|---|---|---|
| 3,851,252 A | * | 11/1974 | Karnaugh et al. | 375/353 |
| 5,572,262 A | * | 11/1996 | Ghosh | 348/607 |
| 6,208,687 B1 | * | 3/2001 | Clemow | 375/232 |
| 2002/0034267 A1 | * | 3/2002 | Chuang et al. | 375/340 |

FOREIGN PATENT DOCUMENTS

| | | | |
|---|---|---|---|
| WO | WO 99/08460 | 2/1999 | ............ H04Q 7/20 |
| WO | WO 99/60721 | 11/1999 | .......... H04B 7/005 |

OTHER PUBLICATIONS

Wai-Hung, H. et al., "An Adaptive Filtering Technique For Pilot-Aided Transmission Systems", IEEE Transactions on Vehicular Technology, vol. 40, No. 3, Aug. 1991, pp. 532-545.

European Search Report.

* cited by examiner

*Primary Examiner*—Amanda T. Le (57) ABSTRACT

A method and an apparatus for a channel estimator comprising a plurality of distinct filters each of which has a set of different coefficients and each of which is selectively coupled to the input and output of the channel estimator. The channel estimator further comprises a switching circuit that receives an error signal and switches to one of the plurality of filters based on the value of the error signal relative to an established threshold. The error signal is from a decoder coupled to a communication channel whose response is being estimated by the apparatus and method of the present invention.

11 Claims, 5 Drawing Sheets

$f_p = \alpha_0 f_0 + \alpha_1 f_1 + R_1$ $f_{2/5} = 3/5 f_0 + 2/5 f_1$ $f_{3/5} = 2/5 f_0 + 3/5 f_1$ $f_{4/5} = 1/5 f_0 + 4/5 f_1$

APPARATUS AND METHOD FOR CHANNEL ESTIMATION USED FOR LINK ADAPTION WITH ERROR FEEDBACK

BACKGROUND OF THE INVENTION

1. Field of the Invention

The present invention is generally related to the use of channel estimators for communication channels.

2. Description of the Related Art

Communication systems, and in particular, wireless communication systems comprise a plurality of communication links through which subscribers of such systems communicate with each other and with the system. Communication signals transmitted and received via such links are often distorted by various anomalies that exist in the communication channels. A link typically comprises a plurality of communication channels. Information being carried by the communication signals is often received erroneously because of the distortion. A common technique used to combat channel anomalies is called link adaptation. Link adaptation is the estimation of link anomalies based on distortions experienced by communication signal propagating through such links; the estimated link anomalies are used to substantially reduce the distortion experienced by the communication signals. Link adaptation is typically used in concert with channel estimation, coding, and decoding techniques.

Channel coding is the addition of redundant information to the information being transmitted to enable a receiver of such information to perform error detection and error correction. There are various well known channel coding and corresponding channel decoding techniques such as Cyclic Redundancy Codes (CRC) and convolutional codes. Prior to being transmitted over a channel, the information is encoded with the use of a channel coder. A channel decoder is used to decode the information after the communication signal has propagated through a communication channel. However, the communication signal is often distorted to such an extent that the decoder cannot properly decode the received encoded information. To combat such distortions, a link adaptation technique is often used for the channel through which the communication signal propagates.

Figure 1:
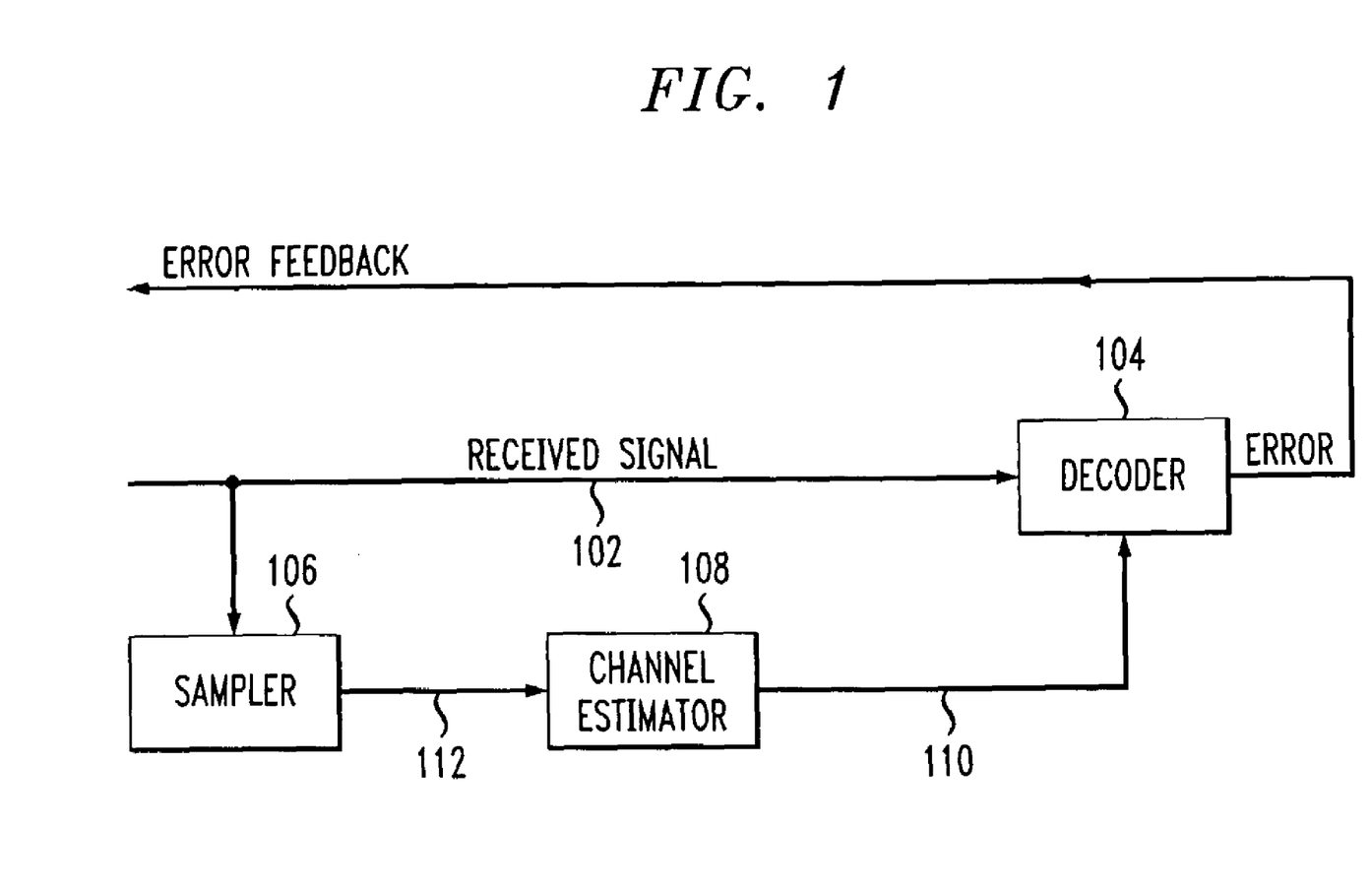
FIG. 1 shows a block diagram of typical link adaptation system.

Referring to FIG. 1, there is shown a block diagram for implementing link adaptation that combats distortions experienced by a communication signal after having traveled through a communication channel. The communication signal is transmitted along with a reference signal. The reference signal is typically a train of equal amplitude reference pulses occurring at equal time intervals. The received communication signal is altered in accordance with the channel response and the channel distortions. The communication signal is received on path 102 and is applied to Decoder 104 and sampler 106. Sampler 106 detects the train of reference pulses and applies it to Channel Estimator 108 via path 112.

Channel Estimator 108 is a circuit (usually a digital filter) that attempts to estimate the response of the channel based on the amplitudes of the received reference pulses. The output of channel estimator 108, which is a waveform that estimates the channel response including all of the distortions, is applied to Decoder 104 via path 110. Decoder 104 performs a subtraction operation between the waveforms on path 110 and 102. Because the waveform on path 102 also contains the channel response, the subtraction operation should result in a waveform that is nearly equal to the original waveform prior to transmission. The resulting waveform is then decoded to derive the information being carried by the communication signal. It is desirable that the resulting waveform be within decodable range; that is the waveform amplitude and/or power levels are in the range within which the decoder is designed to operate. Decoder 104 outputs an error signal indicating the quantity of errors that occurred in the received information. When the difference between the estimated channel response waveform on path 110 and the signal waveform (on path 102) propagated through the channel is within decodable range, the amplitude of the error signal at the output of Decoder 104 is accordingly relatively small. Channel Estimator 108 allows Decoder 104 to process more accurately a received signal thus tending to improve the likelihood of proper decoding and proper error correction and detection.

Figure 2A:
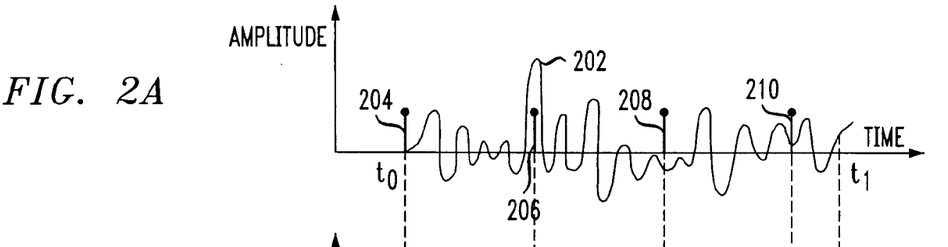
FIGS. 2A–2D shows graphs of waveforms of reference pulses, a communication signal, a channel response and the reference pulses and communication signals altered in accordance with the channel response.
Figure 2B:
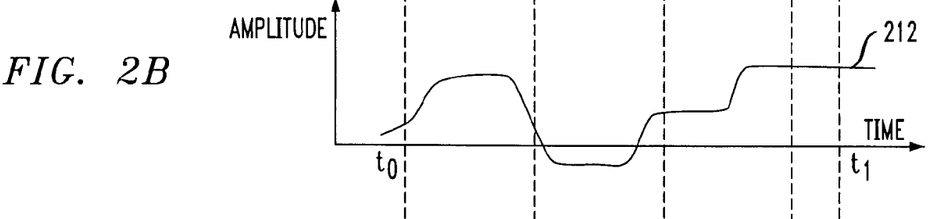
Figure 2C:
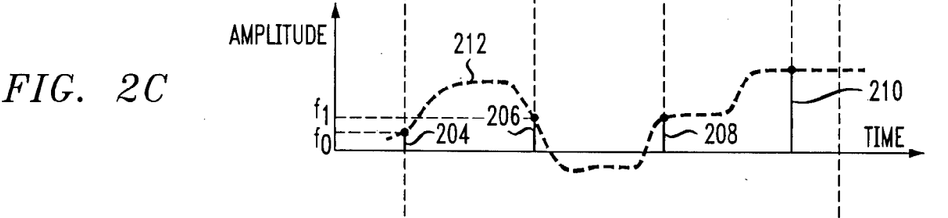
Figure 2D:
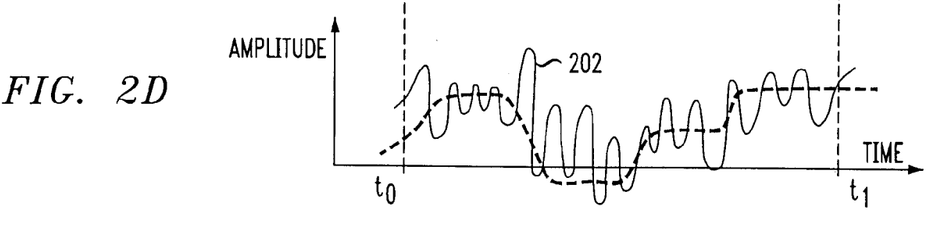

A graphical description of the link adaptation technique described above is shown in FIGS. 2A–2D. The waveforms will be described with respect to the block diagram of FIG. 1. FIG. 2A shows a waveform (202) of the communication signal along with a train of reference pulses (204) having equal amplitudes and occurring at equal time intervals. Waveform (202) and the reference pulses (204, 206, 208, 210) are transmitted between times $t_0$ and $t_1$. FIG. 2B shows the channel response (212) during the same time interval. FIG. 2C shows the output of sampler 106 of FIG. 1, which is configured to detect the train of reference pulses. Note that the reference pulses have been altered in accordance with the channel response 212. FIG. 2D shows the received signal appearing on path 102 of FIG. 1 after having propagated through a channel whose response is shown in FIG. 2B. The reference pulses are removed through well known filtering techniques and thus are not shown in FIG. 2D. Again, note that the received signal has been altered in accordance with the channel response. Channel estimator 108 of FIG. 1 uses the received reference pulses (shown in FIG. 2C) to approximate the channel response, i.e., waveform 212 in FIG. 2B. Thus, the output of channel estimator 108 is a waveform that is an approximation of the waveform in FIG. 2B, i.e., the channel response. Decoder 104 obtains the difference between the approximation channel response waveform and the received distorted waveform to obtain a processed communication signal that is nearly equal to the original transmitted communication signal less the train of pulses. Decoder 104 can then decode the information from the processed received signal.

A major problem with the link adaptation technique described above is the amount of time needed by the channel estimator to generate the estimated waveform; this amount of time is commonly referred to as the convergence time. In wireless applications, the delay experienced by a base station attempting to decode information received from a mobile should be kept as short as possible. Channel characteristics are not static; they change due to many factors. For example, the power or amplitude of the signals being received by a base station changes based on changing channel conditions.

The base station performs power control algorithms between itself and mobiles in an effort to improve power efficiency. Changes in power of received signals tend to alter the channel characteristics making it more difficult for an estimator to approximate the channel response because the channel response changes with the changing power conditions. An estimator having a relatively long convergence time will often generate a channel response that no longer exists making the decoding process more prone to errors.

Channel estimators are implemented as transversal filters, Wiener feedback filters and Kalman filters. A transversal filter is a well known digital filter architecture that uses fixed filter coefficients to generate a waveform. Because the coefficients are fixed, such a filter cannot adapt to changing channel conditions. Further, the convergence time of such a filter is often relatively long because of the order of the filter. The order of the filter is defined by the number of filter coefficients used in implementing the filter. Thus an input waveform is processed by a relatively high number of filter blocks when a high order transversal filter is used; this tends to increase the convergence time.

Figure 3:
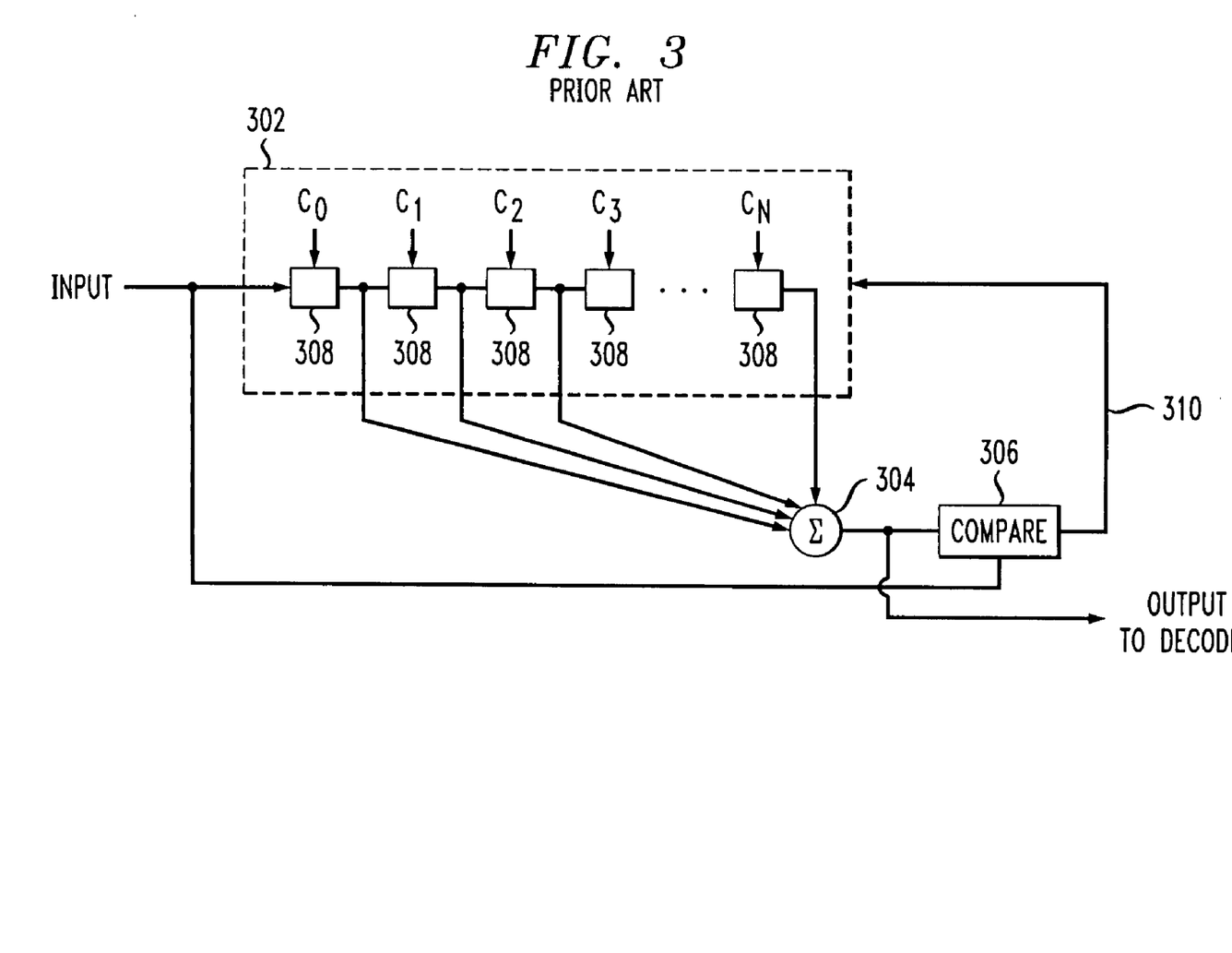
FIG. 3 shows the architecture of a typical digital filter with feedback.

Referring to FIG. 3, there is shown the architecture of a Wiener feedback filter. The Wiener filter comprises a bank of coefficients ($c_0 \ldots c_N$) applied to delay blocks 308. The coefficients are multiplied to delayed versions of the input. The multiplication operations are performed by multiplier blocks (not shown) which can be implemented as part of the delay blocks. The delay blocks in conjunction with the coefficients and summer 304 perform a filtering operation. Compare circuit 306 compares the signal at the output of the filter with the input signal to the filter and any difference between the two signals causes the compare circuit to generate a feedback signal on path 310. The feedback causes the coefficients to be modified based on a particular algorithm.

As described above, Wiener feedback filters (and also Kalman filters) are digital filters whose coefficients are not constant. Wiener filters and Kalman filters are both feedback filters whose outputs are fed back to their input to allow their coefficients to be updated. The architecture of these filters tends to be rather complex. Further, the algorithms used to calculate and update the coefficients also tend to be relatively complex. Consequently, both Wiener and Kalman filters can take an inordinately long time to converge. Many times, depending on the input waveform, a Kalman or a Wiener filter may not converge at all.

What is therefore needed is a channel estimator having a relatively simple architecture and has a relatively short convergence time. What is also needed is a channel estimator that can adapt to varying channel conditions.

SUMMARY OF THE INVENTION

The present invention provides a channel estimator comprising a plurality of selectable distinct filters each of which has a different set of pre-calculated filter coefficients. The channel estimator further comprises a switching circuit that causes one of the filters to be selected based on an error signal. The error has a certain value such as error magnitude or frequency of errors. The switching circuit selects one of the plurality of distinct filters so as to reduce the error value. The channel estimator has an input and an output and the selected filter is coupled to the input and the output of the channel estimator.

In a preferred embodiment the coefficients of the filters are calculated using Lagrangian Interpolation of a waveform representing the response of a communication channel. A set of pre-calculated coefficients is generated for each filter where each filter has a different order. The switching circuit selects a filter in response to the error signal. For example, it is generally known that filters of higher orders are more robust and thus a higher error magnitude would require the selection of a higher order filter or an increasing rate of error would require the selection of a higher order filter. The switching circuit switches between different filters based on communication channel conditions reflected by an error signal generated by a decoder coupled to such a channel. The channel estimator of the present invention is preferably implemented using software techniques. The filter operations such as delay, multiplication, and summation are implemented as part of a computer program that uses pre-calculated and pre-stored coefficients. Signals from the communication channel as well as the received error signal are sampled and digitized in a well known fashion and each sample is applied to a distinct filter implemented using software techniques.

The structure of the channel estimator of the present invention guarantees convergence because there are no calculations of coefficients or modifying of existing coefficients. All coefficients are pre-calculated and are part of distinct filters each of which has its own distinct filter characteristics and whose coefficients are not calculated based on the coefficients of any of the other filters. The convergence time tends to be relatively short because there is no calculation or modification of coefficients during the estimation process. Because each filter has a different set of coefficients and different filter characteristics, the channel estimator is able to adapt to varying channel conditions.

DETAILED DESCRIPTION

Figure 4:
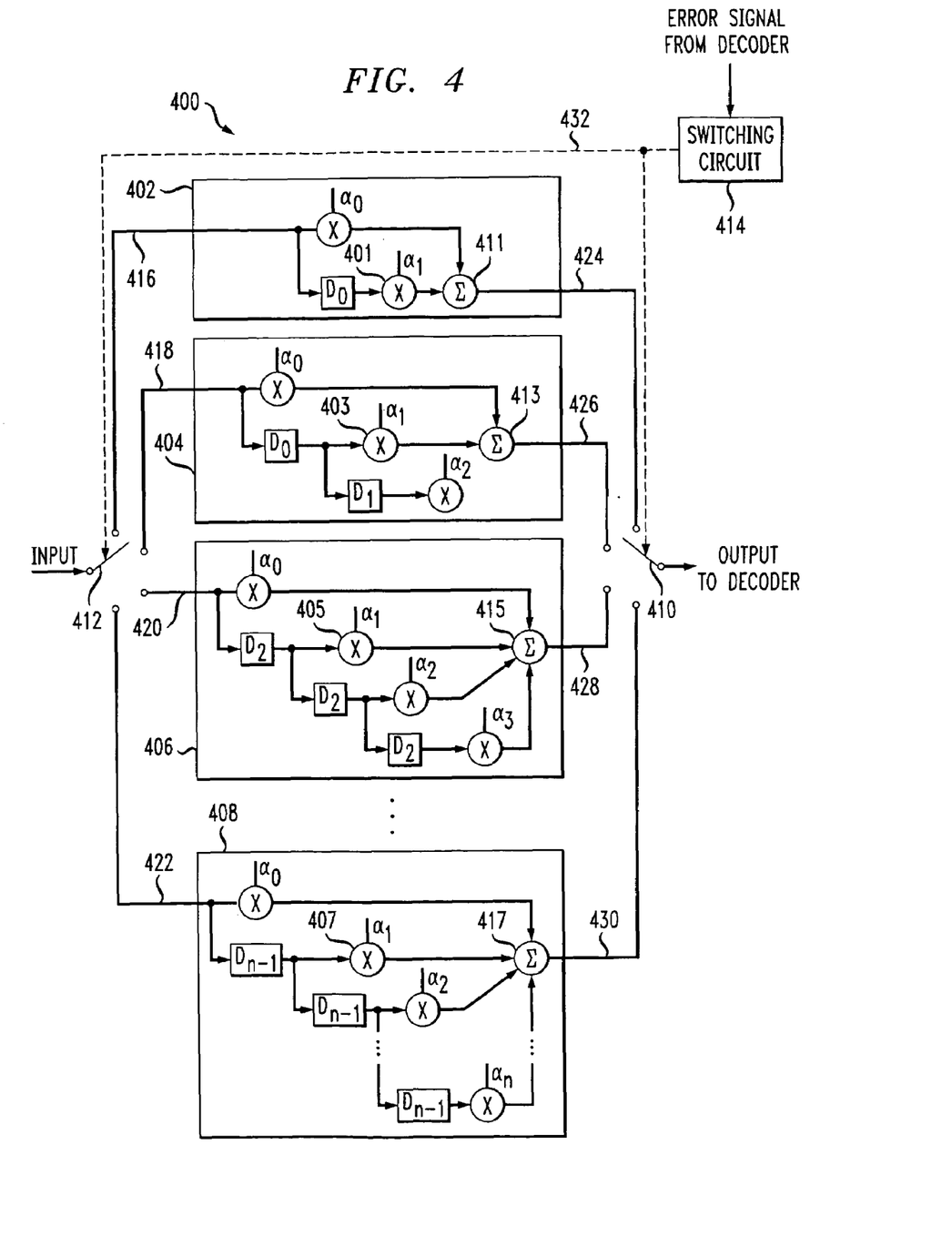
FIG. 4 shows the apparatus of the present invention.

Referring to FIG. 4, there is shown the channel estimator of the present invention comprising N distinct filters each of which has a different set of pre-calculated coefficients where N is an integer equal to 2 or greater. The pre-calculation of the coefficients is based on interpolation techniques one of which is discussed infra. The pre-calculation of the coefficients can also be based on other techniques and is therefore not strictly limited to interpolation. N is an integer equal to 2 or greater. Each of the distinct filters is selectably coupled to the input via switch 412 and to the output via switch 410. Each of the filters have delay blocks (e.g., $D_0, D_1, \ldots, D_{n-1}$) and multipliers (e.g., 401, 403, 405, 407) and summers (e.g., 411, 413, 415, 417) which together perform filtering operations. Each of the filters is a distinct filter having its own set of coefficients that is unrelated to the set of coefficients of any of the other filters. Thus, unlike the prior art where a set of filter coefficients is obtained by modifying an existing set of coefficients, the channel estimator of the present invention has a set of fixed pre-calculated coefficients for each distinct filter. Each of the filters has its own filter characteristics; typical well known filter characteristics comprise a filter magnitude response, phase response and group delay. Also, the delay provided by delay blocks of one filter is not necessarily equal to the delay provided by the delay blocks of another filter. Although the filters shown in FIG. 4 have non-recursive architectures (i.e., no feedback paths), it should be noted that the channel estimator of the present invention also comprises recursive filters (i.e., filters with feedback paths). In sum, each distinct filter has a distinct set of coefficients and a distinct filter characteristic.

In a preferred embodiment, the channel estimator of the present invention is implemented using software techniques. For example, the channel estimator can be part of a computer program that performs the operations of a digital filter as shown in FIG. 4. The program performs the multiplication, delay, and summation operations as shown in FIG. 4. The input and output switches (i.e., 410 and 412 as well as switching circuit 414 are also implemented using software techniques. The switches and the switching circuit can also be part of a computer program that selects one distinct filter from a plurality of N distinct filters based on the received error signal. The error signal and the input signals to the channel estimator are sampled and digitized in a well known fashion and then applied to the software implementation of the channel estimator of the present invention. A signal from a communication channel whose response is being estimated is applied to the selected filter. In another embodiment, each of the N distinct filters has a different order. In yet another embodiment, each of the N distinct filters is a non-recursive filter, i.e., there are no feedback paths in the filter structures.

Switching circuit 414 receives an error signal indicating, for example, the amount of errors and/or the frequency of errors detected by a decoder (not shown) or some indication of error by the decoder. Based on particular characteristics of the error signal, switching circuit 414 causes switches 412 and 410 to select one of the N distinct filters. Switches 412 and 410 are ganged together in the sense that they couple respectively to the input path and output path of the same filter. For example, when switching circuit 414 selects filter 402 it generates a control signal via path 432 which causes switch 410 to couple to output path 424 of filter 402 and causes switch 412 to couple to input path 416 of filter 402. The switches couple to the other input paths (e.g., 418, 420, 422) and output paths (e.g., 426, 428 and 430) of the other filters (e.g., 404, 406, 408) in the same manner.

Each of the filters performs an interpolation operation in estimating the response of a communication channel. The interpolation can be based on any number of samples of the communication channel. The samples are the received altered reference pulses. The number of samples used in the interpolation determines the order of the filters chosen. For example, for a two sample interpolation, a second order filter is selected where the order refers to the number of coefficient contained in the filter. Thus, for a second order filter performing a two-sample interpolation, filter 402 is the applicable filter. Referring back to FIG. 2C, suppose the two samples are reference pulses 204 and 206. Filter 402 will estimate values (e.g., amplitude or power level) located between reference pulse 204 and reference pulse 206 estimating the channel response (212 shown in dashed line).

The particular interpolation used is called Lagrangian interpolation; *Handbook of Mathematical Functions with Formulas, Graphs and Mathematical Tables*; M. Abramowitz and I. A. Stegun, National Bureau of Standards, June 1964, pp. 878–879. It will be readily understood that other types of mathematical interpolation formulas can be used. The present invention is not at all limited to Lagrangian interpolation. It should be noted that each of the N filters need not have different orders. Some of the filters can have the same order but still have different coefficients. Thus, for any filter order, there can be more than one set of coefficients and thus more than one filter. For example, the channel estimator of the present invention can have two second order filters; one filter with coefficients derived from Lagrangian interpolation and another filter (also second order) with coefficients derived from an interpolation formula different from the Lagrangian formula. Each of the second order filters is a distinct filter with its own set of coefficients and filter characteristics. For ease of explanation and illustration, however, FIG. 4 shows a channel estimator comprising N filter blocks where each of the filter blocks has a different order. Thus, for filter 402 coefficients $\alpha_0$ and $\alpha_1$ are calculated in accordance with the following Lagrangian interpolation formulas:

$$\alpha_0 = 1-p$$

$$\alpha_1 = p$$

where $$p = \frac{m}{M}$$

and where m is the $m^{th}$ symbol in a packet and M is the total number of symbols in the packet. The estimator receives the samples in the form of packets (i.e., a block of bits) whereby each packet contains M symbols. Each symbol (i.e., a sub-block of bits) represents a particular value (i.e., amplitude or power level) measured from the channel. One of the M symbols in the received packet is a reference pulse. The reference pulse is located somewhere in the packet, i.e., the $m^{th}$ symbol in the packet. Typically, the protocol being followed by the communication system requires that the receiver and thus the channel estimator and sampler be advised of the location of the reference pulse within the packet. Thus for example, suppose for the two sample case, M=5; that is, each packet contains 5 symbols, one of which is a reference pulse which is known to be located in the second sub-block of the packet. Because the reference pulses are transmitted at equal time intervals, the reference pulses in all subsequent received packets will be located in the same position, i.e., the second symbol position. Thus, the location of the reference pulse within the first packet received determines the value for m. In our example, the reference pulse is known to be in the second position within the packet and thus establishes m as equaling to 2; that is for all successive packets received, the reference pulse is now known to be in the second position within the packet. The coefficients are based on channel characteristics and transmission format. For example, for the two-sample case discussed above, the coefficients are based on p, which is based on the particular format of transmitted packets and the location of the reference pulses within each packet. Therefore, the coefficients are pre-calculated and are applied during the channel estimation process to the received altered reference pulses as discussed infra. There is no calculation of coefficients during the channel estimation process.

Figure 5:
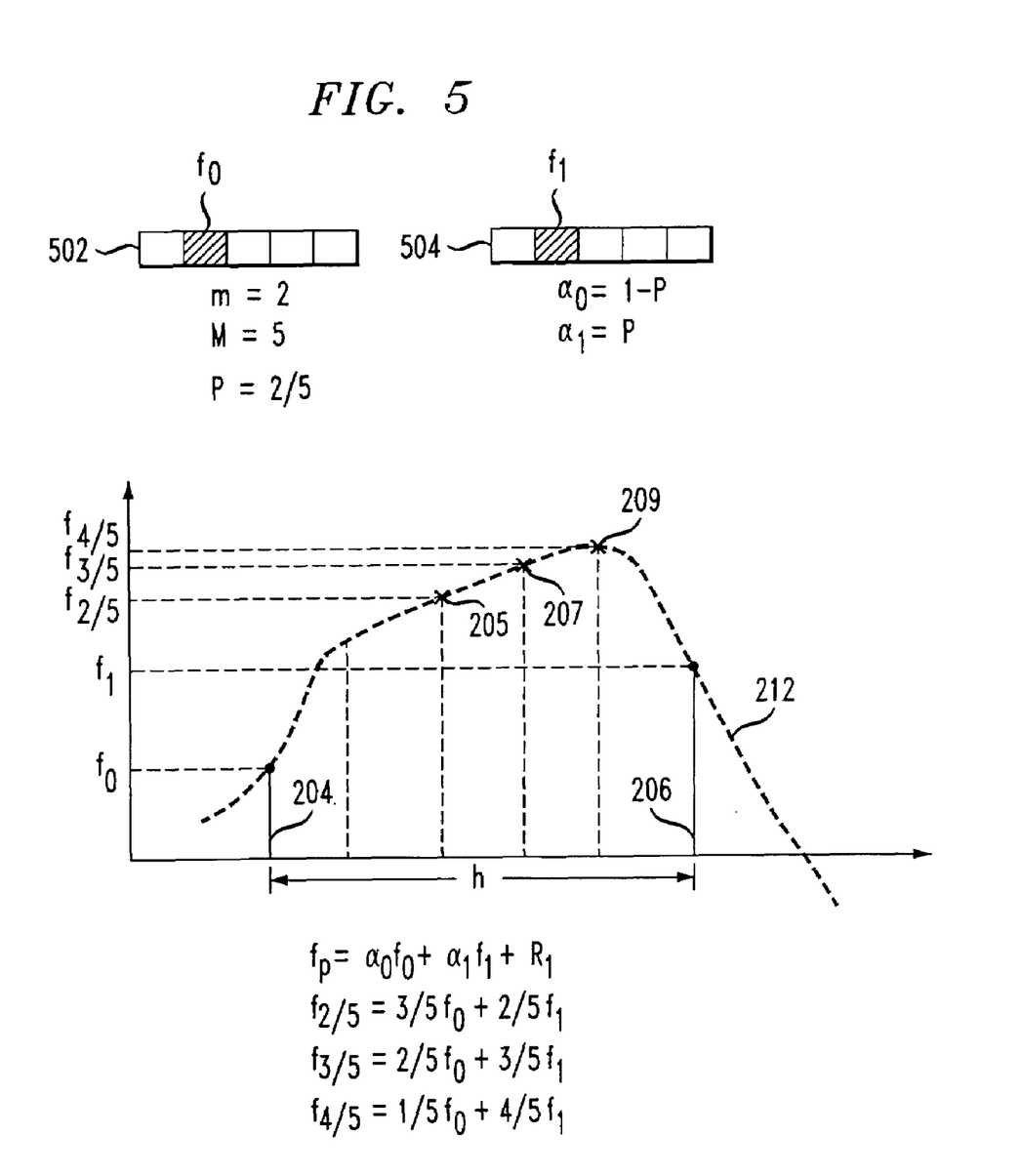
FIG. 5 shows a portion of FIG. 2C along with a packet format for received reference pulses and the formula for the calculation of estimated values for two-sample Lagrangian interpolation.

FIG. 5 shows two packets, each of which contains a reference pulse, and FIG. 5 also shows a closer view of a portion of FIG. 2C. Still referring to FIG. 5, the second symbol of packet 502 contains the amplitude value (say $f_0$) of reference pulse 204. The second symbol of packet 504 contains the amplitude value (say $f_1$) of reference pulse 204. Lagrangian interpolation attempts to estimate M−m points of the channel response between the two reference pulses. The time interval between the two reference pulses is labeled h where h can be thought of being divided into M equal intervals. The channel estimation process is performed as follows: since M=5 and m=2, $$p = \frac{2}{5}$$

which represents the starting point for the interpolation. In other words the initial value or the first interpolation point is located at a time instant equaling $$\frac{2}{5}h$$

or at the end of the second time interval within the h time period. The Lagrangian interpolation formula for the two-sample case is $f_p = \alpha_0 f_0 + \alpha_1 f_1 + R_1$ where $R_1$ is an interpolation constant based on measured channel conditions. The two received reference pulses are thus applied to filter 402, which performs the interpolation as per the interpolation formula for a two-sample case. In general, for n-sample interpolation (n is an integer equal to 2 or greater) n received reference pulses are applied to an n-order non-recursive filter.

Continuing with the two-sample example and starting with $$p = \frac{2}{5},$$

the estimated value at time instant $$\frac{2}{5}h$$

is shown as pont 205 with value $$f_{\frac{2}{5}}$$

obtained from the application of the Lagrangian interpolation formula for two samples. The value for m is increased by 1 resulting in $$p = \frac{3}{5}.$$

The estimated value at time instant $$\frac{3}{5}h$$

is shown as point 207 with value $$f_{\frac{3}{5}}.$$

The third estimated value (i.e., point 209) is calculated in a manner similar to the previous two points. It will readily understood that the estimated values for the channel response may or may not be as accurate as is shown in the graph of FIG. 5. The accuracy of the estimated values will depend on the robustness of the interpolation method and the dynamics of the communication channel. Therefore, the estimated values shown in FIG. 5 are for illustrative purposes only. A similar procedure as described above is used to calculate coefficients for any filter order. Each filter order has its own set of coefficients; that is $\alpha_0$ for the second order filter is different from the $\alpha_0$ of the third order filter (i.e., filter 404 of FIG. 4).

The apparatus of the present invention performs the estimation using different sets of pre-calculated coefficients assigned to different filters. When all of the filters are non-recursive, there is no calculation of coefficients, no updating of coefficients and no possibility of non-convergence; convergence is guaranteed. The channel estimator of the present invention uses arbitrarily derived rules based on error conditions to switch between the different filters. The switching of the filters is based on an error signal and an arbitrarily defined threshold that is a function of the error signal. For example, the threshold can represent the frequency of errors detected by a decoder, the quantity of errors detected by a decoder or some combination of quantity and frequency of errors detected by a decoder. When the threshold is surpassed, the switching circuit of the apparatus of the present invention (i.e., circuit 414 of FIG. 4) will switch to a higher order filter (which requires a higher number of samples) in order to more accurately estimate the channel response and thus reduce the number and/or frequency of errors detected by the decoder. The switching circuit can also switch to another filter having the same order but different characteristics (different set of coefficients unrelated to the set of coefficient of the previous filter) which would cause the error to be reduced.

The error signal is generated by a decoder coupled to a communication channel whose response is being estimated by the channel estimator of the present invention. The switching is done based on an error signal that quantifies the error characteristics of the channel as interpreted by a decoder coupled to such channel. The switching to a particular filter of a particular order depends on the set of arbitrary rules being used by the switching circuit of the apparatus of the present invention. For example, suppose a filter of order n (n is an integer equal to 2 or greater) is being used to perform the channel estimation and an error signal surpassing the established threshold is generated by the decoder. The switching circuit will then switch to a filter of order n+1. The switching circuit will continue to increase the order by 1 until the error signal is below the established threshold. Another algorithm can cause the switching circuit to switch to a filter of order n+2 depending on how much above or below the established threshold is the error signal. In some circumstances, even though the error signal is below the established threshold, the switching circuit may still want to switch to a higher order filter to further improve the performance of the decoder. Therefore, the determination of the order of the selected filter (and thus the quantity of reference pulses to use as samples) is based on the value of the error signal relative to the value of the established threshold. The error signal has the same units as the threshold. For example, if the threshold is based on error rate, the error signal is based on the measured error rate. In general, if the error signal is based on some combination of measurements of different error characteristics, the error magnitude (e.g, error rate, error frequency) is derivable from such error signal.

It should be noted that the apparatus and method of the present invention can be implemented in various manners well known to those skilled in the pertinent art. For example, the channel estimator can be implemented with digital signal processors having pre-stored coefficients or digital hardware controlled by firmware or software. It will be understood that the various implementations or alternatives well known to those skilled in the art to which this invention belongs are part of this invention.

We claim:

1. A channel estimator having an input and an output, the channel estimator comprising:
   a plurality of distinct filters selectably coupled to the input and the output wherein each one of the plurality of filters has a different set of pre-calculated filter coefficients; and
   a switching circuit that selects one of the plurality of distinct filters based on an error signal.

2. The channel estimator of claim 1 wherein the plurality of filters comprises N filters where N is an integer equal to 2 or greater and each one of the N filters has a different order.

3. The channel estimator of claim 1 wherein the plurality of filters comprises N filters where N is an integer equal to 2 or greater and each one of the N filters is a non-recursive filter.

4. The channel estimator of claim 1 where the pre-calculated filter coefficients are calculated using Lagrangian interpolation.

5. The channel estimator of claim 1 where the pre-calculated filter coefficients are calculated using interpolation other than Lagrangian.

6. The channel estimator of claim 1 wherein each one of the plurality of filters has an input path and an output path whereby the input path of a selected filter is coupled to the input and the output path of the selected filter is coupled to the output.

7. The channel estimator of claim 1 wherein the error signal is received from a decoder coupled to a communication channel whose response is being estimated by the channel estimator.

8. A method for estimating a response of a communication channel, the method comprises the steps of:
   providing a plurality of distinct selectable filters each of which has an order and a different set of pre-calculated coefficients; and
   selecting one of the plurality of distinct filters based on an error signal resulting from a decoding operation on a signal from the communication channel.

9. The method of claim 8 further comprising the steps of:
   receiving reference signals which have propagated through the communication channel; and
   applying the received reference signals to the selected filter.

10. The method of claim 9 wherein the step of applying the received reference signal to the selected filter comprises determining a quantity of received reference signals to be applied thus determining the order of the selected filter.

11. The method of claim 8 where the step of selecting one of the plurality of distinct filters comprises the steps of:
    establishing a value for the received error signal;
    establishing a threshold value that is a function of the error signal; and
    selecting the one filter based on the value of the received error signal relative to the value of the established threshold.

* * * * *